March 18, 1952   A. W. KONCHAN   2,589,820
SHOCK ABSORBER LINK
Filed Sept. 8, 1948
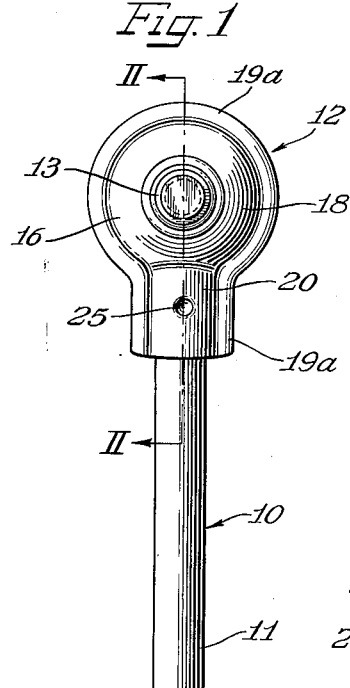
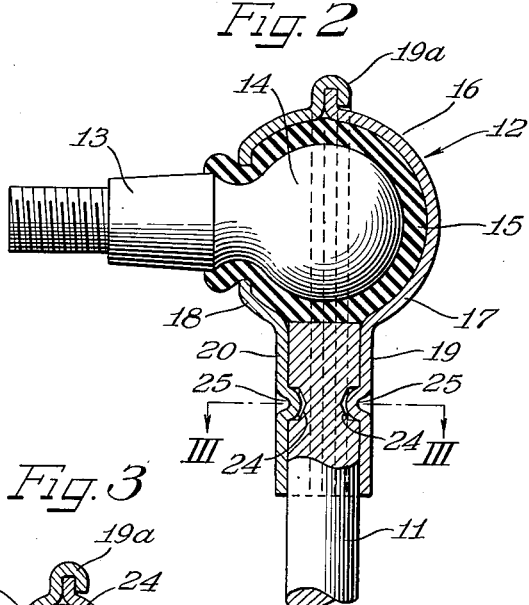
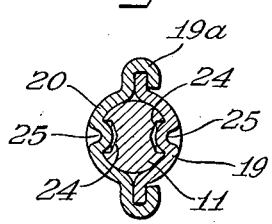
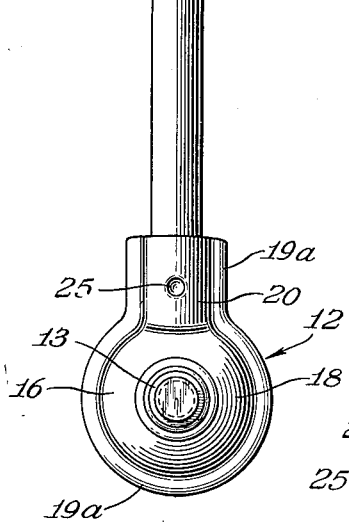
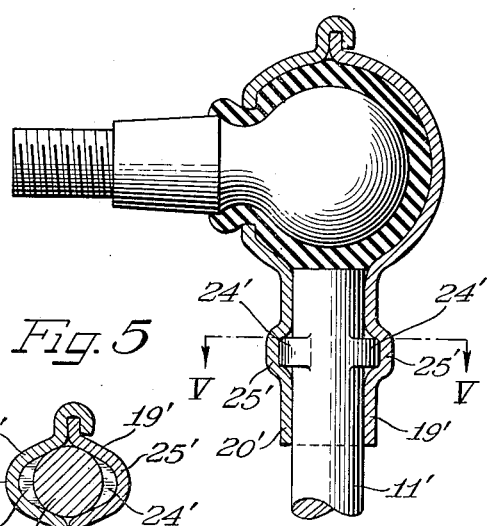
Inventor
Anton W. Konchan
by The Firm of Charles W. Hills Attys Patented Mar. 18, 1952

2,589,820

UNITED STATES PATENT OFFICE 2,589,820

SHOCK ABSORBER LINK

Anton W. Konchan, Berwyn, Ill.

Application September 8, 1948, Serial No. 48,191

1 Claim. (Cl. 287—85)

This invention relates to links and more particularly to novel means for fastening together parts of a shock absorber link.

An object of this invention is to provide an improved and simplified way of fastening a link pin to the ball casing of a link such as is commonly used at the present time with shock absorbers.

Yet another object of this invention is to provide fastening means for holding a pin in a sleeve end of a generally ball-shaped casing which will lend itself to economical large production and which will not deleteriously weaken the metal structure of the fastened parts.

In accordance with the general features of this invention there is provided in a link joint cooperating ball socket halves and a rod or pin section interposed between the reduced sections of the halves, means for interlocking the rod section to the other sections comprising depressions and projections in the rod and reduced sections extending one into the other for tying them together against relative movement.

In accordance with other features of the invention, one form of the fastening means comprises a dimple on the reduced end of the ball socket extending into a depression in the cylindrical wall of the pin or rod whereas in another form the projection is on the pin and the depression is in the cooperating part.

Other objects and features of this invention will more fully appear from the following detail description taken in connection with the accompanying drawings which illustrate several embodiments thereof and in which:

Figure 1 is a side view of a well-known type of shock absorber link using my novel fastening means;

Figure 2 is an enlarged fragmentary cross-sectional view taken on the line II—II of Figure 1, looking in the direction indicated by the arrows, of one end of the link, the other end of the link being of identical construction;

Figure 3 is a cross-sectional view taken on the line III—III of Figure 2 looking downwardly;

Figure 4 is a cross-sectional view similar to Figure 2 but showing a modified form of fastening means; and Figure 5 is a sectional view similar to Figure 3 but taken on the line V—V of Figure 4 looking downwardly.

As shown on the drawings:

The reference character 10 designates generally a shock absorber link which, apart from my novel fastening means, is of a well-known type in the automotive industry. It includes a cylindrical pin or rod section 11 having attached to its opposite ends ball joint assemblies 12—12 which are identical in construction. Each of these assemblies embody my novel fastening means so that the description of one will suffice for both.

As best shown in Figure 2 the ball joint assembly 12 includes a pin 13 having a ball 14 universally journalled in a spherical like mass of rubber 15 inside of a socket casing 16 comprising two metal halves 17 and 18 seamed together at 19a and which have cooperating substantially identical reduced pin receiving sections 19 and 20.

It will be noted that the seam 19a extends clear around the halves so that the same is common to the socket or ball portion as well as to the reduced sections 19 and 20. Any suitable means may be employed for forming the same in the metallic half sections 17 and 18.

My invention is particularly concerned with the fastening means between the reduced casing sections 19 and 20 and the pin or rod section 11. In the first form of the invention the rod is provided with opposite identical indentations 24 (Figure 3) and the sections 19 and 20 are provided with identical depressions or dimples 25—25 nested and interlocked in the depressions 24—24. In this manner the pin is tightly fastened to the ball assembly 12 and is firmly held against both rotary and longitudinal movement relative to the assembly.

In the assembling of the pin in the reduced sections 19—20 of the casing, it is first inserted in the reduced sections and then the reduced sections are subjected to a press operation for forming the depressions 25—25 into the indentations 24—24. Any suitable punch may be used for this purpose.

The modification shown in Figures 4 and 5 is identical to that shown in Figures 2 and 3 with the exception that the pin 11' has diametrically opposite projections 24'—24' and which extend into diametrically opposite depressions 25'—25' in the reduced socket casing sections 19' and 20'.

In this case the sections 19' and 20' are provided with the depressions 24'—24' prior to their assembly together around the end of the pin 11'. It follows that after the sections 19' and 20' are lock-seamed together, the pin 11' will be tightly interlocked therewith by reason of the projections 24' extending into the depressions 25'.

While the foregoing means of securing the pin or rod to the ball casing is relatively simple, nevertheless the invention is of commercial importance from the standpoint of economical manufacture and assembly of the parts of the link.

The slight indentations made in the reduced sleeve sections of the ball assembly do not deleteriously affect the metallurgical structure of the same and insures a very effective and positive interlocking of the parts together.

It should be noted that in the first form of the device the depressions 25 could be preformed, as in the case of depressions 25', and then interlocked in the indentations 24 in the assembly of the parts.

I claim as my invention:

In a linkage assembly, a housing comprising a pair of metal halves shaped to form complementary half sections of a ball-shaped socket with a reduced diameter cylindrical pin receptacle extending from one side thereof, said halves having interlocking flanges at their respective abutting edge portions to matingly engage one another in locked-together assembly, a hollow spherical rubber bushing in said socket, a stud having a ball on the end thereof universally journaled in said bushing and a rod in said pin receptacle, said rod and the half sections of said pin receptacle having interlocking dimples and projections formed therebetween to matingly engage on another in locked-together assembly.

ANTON W. KONCHAN.

REFERENCES CITED

The following references are of record in the file of this patent:

UNITED STATES PATENTS

| Number | Name | Date |
|---|---|---|
| 1,548,990 | Garman | Aug. 11, 1925 |
| 1,693,839 | Faudi | Dec. 4, 1928 |
| 1,824,450 | Sneed | Sept. 22, 1931 |
| 1,931,102 | Casper | Oct. 17, 1933 |
| 2,305,880 | Leighton | Dec. 22, 1942 |
| 2,420,621 | Ricks | May 13, 1947 |